United States Patent
Shimanuki

(10) Patent No.: US 8,248,643 B2
(45) Date of Patent: Aug. 21, 2012

(54) IMAGE FORMING APPARATUS

(75) Inventor: Toshihiro Shimanuki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 883 days.

(21) Appl. No.: 12/320,239

(22) Filed: Jan. 22, 2009

(65) Prior Publication Data

US 2009/0219565 A1 Sep. 3, 2009

(30) Foreign Application Priority Data

Feb. 28, 2008 (JP) ................... 2008-048518

(51) Int. Cl.
*G06F 3/12* (2006.01)
*G06K 15/00* (2006.01)
(52) U.S. Cl. ...................... 358/1.15; 358/1.16
(58) Field of Classification Search .......... None
See application file for complete search history.

(56) References Cited

U.S. PATENT DOCUMENTS 6,304,335 B1 * 10/2001 Furuya et al. ............. 358/1.15

FOREIGN PATENT DOCUMENTS

JP 2004-272765 9/2004

* cited by examiner

*Primary Examiner* — Dov Popovici
(74) *Attorney, Agent, or Firm* — Kubotera & Associates, LLC

(57) ABSTRACT

An image forming apparatus for receiving data from a host device to print on a print medium includes a termination code string comparison table for storing a detection termination code string to detect a termination code string from the data; and a reception control unit for detecting a candidate of the termination code string from the data. The reception control unit compares the candidate with the termination code string to determine whether the termination code string matched to the candidate is stored in the termination code string comparison table. The reception control unit determines the candidate to be the termination code string when the reception control unit determines that the termination code string matched to the candidate is registered in the termination code string comparison table.

14 Claims, 15 Drawing Sheets

```
%!PS-Adobe-3.0 EPSF-3.0
%%BoundingBox: 4 4 608 407
%%Title: (ARTWORK.EPS)
%%CreationDate: (10/17/89) (5:04 PM)
%%EndComment
    PostScript code for illustration
showpage
%%EOF
```

| |
|---|
| First termination code string |
| Second termination code string |
| Third termination code string |

UEL Code (PJL)

CTRL-D (PDL: PostScript)

%%EOF (PDF、EPS)

FIG. 3

IMAGE FORMING APPARATUS

BACKGROUND OF THE INVENTION AND RELATED ART STATEMENT

The present invention relates to an image forming apparatus for printing on a print medium using print data received from a host device.

When a conventional image forming apparatus starts receiving a print job, the conventional image forming apparatus recognizes a data string thus received as one print job when a termination code appears in the data thus received or the conventional image forming apparatus does not receive data for a specific period of time. (refer to Patent Reference).
Patent Reference: Japanese Patent Publication No. 2004-272765

The termination code includes a UEL (Universal Exit Language) code of a PJL (Printer Job Language), a termination code (for example, a CTRL-D code in a case of the PostScript language) in an arbitrary PDL (Page Description Language), and the likes.

The conventional image forming apparatus described above is generally provided with a direct printing function of a PDF (Portable Document Format) file and a direct printing function of an EPS (Encapsulated Post Script) file, i.e., an image format widely used for a DTP (Desktop Publishing) application.

The PDF file or the EPS file does not include a recognizable termination code. Accordingly, when the PDF file or the EPS file is received from a host device using the direct printing function, the conventional image forming apparatus does not find the termination code. Instead, the conventional image forming apparatus determines that the termination code of the print job is found after the PDF file or the EPS file is received and the data are not received for a specific period of time.

SUMMARY OF THE INVENTION

According to a first aspect of the present invention, an image forming apparatus for receiving data from a host device to print on a print medium includes a termination code string comparison table for storing a detection termination code string to detect a termination code string from the data; and a reception control unit for detecting a candidate of the termination code string from the data. The reception control unit compares the candidate with the termination code string to determine whether the termination code string matched to the candidate is stored in the termination code string comparison table. The reception control unit determines the candidate to be the termination code string when the reception control unit determines that the termination code string matched to the candidate is registered in the termination code string comparison table.

According to a second aspect of the present invention, an image forming apparatus for receiving data including a plurality of codes from a host device to print on a print medium, comprises a reception control unit for analyzing the data to detect a code string deemed to be a termination code; and a termination code string comparison table for storing a termination code string input from the host device. The reception control unit compares the termination code with the termination code string retrieved from the termination code string comparison table to determine that the data includes the termination code from a comparison result.

According to a third aspect of the present invention, an image forming apparatus for receiving data from a host device to print on a print medium, comprises a reception unit for receiving the data including a plurality of codes; a history buffer for storing code strings having the codes; a reception control unit for analyzing the data to detect the code string deemed to be a termination code from an analysis result, said reception control unit storing the code string to the history buffer, reception control unit comparing a detection result of a termination code detection unit with the code string stored in the history buffer; and a count number storage unit for counting a number of reception timeouts of the data. The reception control unit determines that the data includes the termination code when a counter counts more than a specific number.

In the first aspect of the present invention, the reception control unit determines the candidate to be the termination code string when the reception control unit determines that the termination code string matched to the candidate is registered in the termination code string comparison table. Accordingly, it is possible to start a printing operation without waiting a reception timeout. As a result, even when a receiving data is received from the host device through a direct printing function, it is possible to reduce a printing start time of the file.

BRIEF DESCRIPTION OF THE DRAWINGS

FIG. 3 is a schematic view showing a termination code string comparison table according to the first embodiment of the present invention;

DETAILED DESCRIPTION OF THE PREFERRED EMBODIMENTS

Hereunder, embodiments of the present invention will be explained with reference to the accompanying drawings.

First Embodiment

Figure 1:
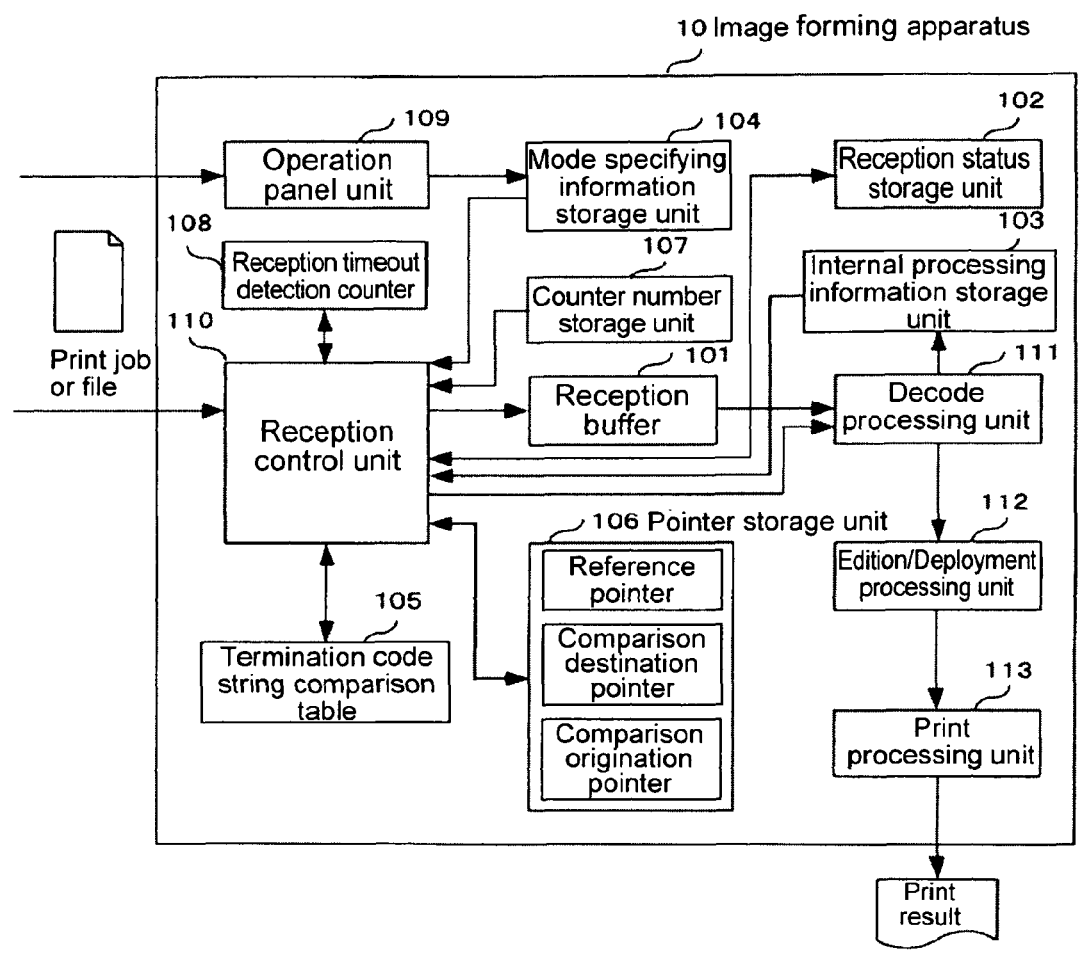
FIG. 1 is a block diagram showing a configuration of an image forming apparatus according to a first embodiment of the present invention.
Figure 2:
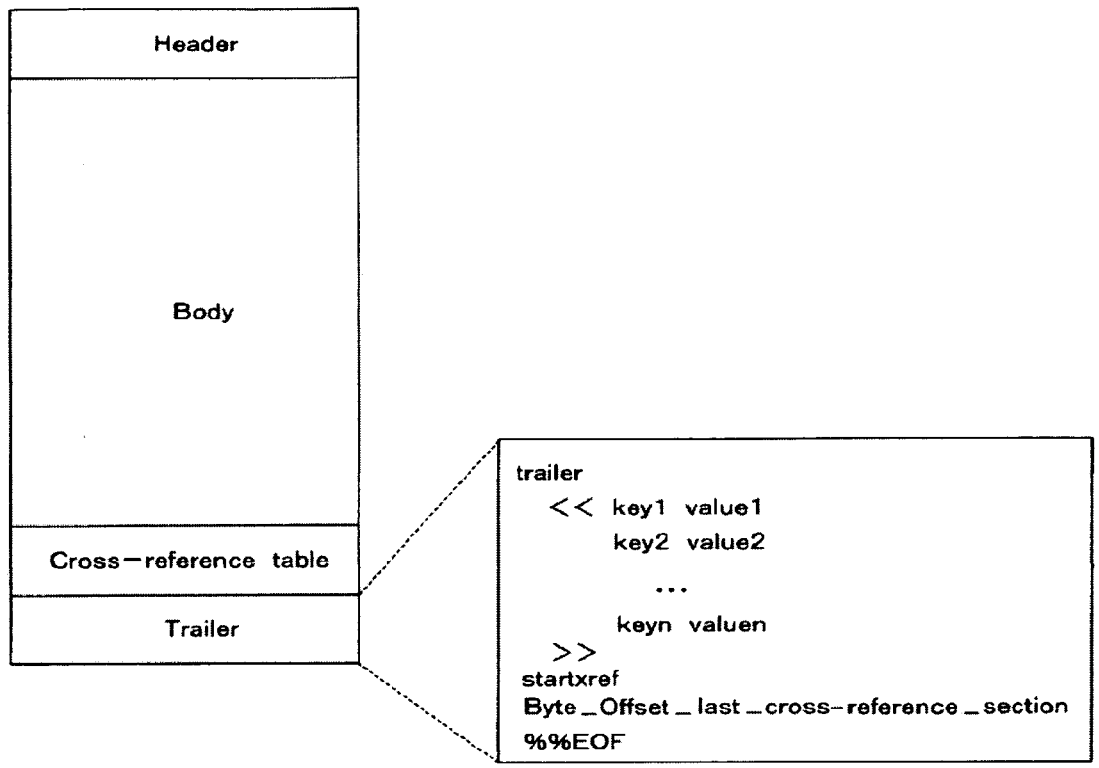
FIG. 2(a) is a schematic view showing a configuration of a PDF (Portable Document Format) file.
FIG. 2(b) is a schematic view showing a configuration of an ESP (Encapsulated Post Script) file.

A first embodiment of the present invention will be explained. FIG. 1 is a block diagram showing a configuration of an image forming apparatus 10 according to the first embodiment of the present invention. FIG. 2(a) is a schematic view showing a configuration of a PDF (Portable Document Format) file. FIG. 2(b) is a schematic view showing a configuration of an ESP (Encapsulated Post Script) file.

In the embodiment, the image forming apparatus 10 is configured to print on a print medium using a print job received form a PC as a host device and written in a PJL (Printer Job Language) or a PDL (Page Description Language). Further, the image forming apparatus 10 is configured to print on a print medium using the PDF (Portable Document Format) file as shown in FIG. 2(a) or the ESP (Encapsulated Post Script) file shown in FIG. 2(b).

The PDF (Portable Document Format) file and the ESP (Encapsulated Post Script) file will be explained next. As shown in FIG. 2(a), the PDF file includes a header area, a body area, a cross-reference table area, and a trailer area. In the header area, header data formed of a file name, a file creation date, destination information, and the likes are written. In the body area, print data are written. In the cross-reference table area, index information for accessing individual object information included in the print data is written. In the trailer area, position information of a cross-reference table (an off-set value from a front end of a file) is written.

Further, one line "%% EOF" indicating an end of the file is situated at an end portion of the trailer area. Note that line break characters <CR><LF> are omitted in the termination code string "%% EOF" shown in FIG. 2(a), and an actual line is "<CR><LF>%% EOF<CR><LF>".

As shown in FIG. 2(b), the EPS file includes header data (from "%!PS-Adobe-3.0 EPSF-3.0" to "%% End Comment" in FIG. 2(b)); print data ("PostScript code for illustration" in FIG. 2(b)); and the termination code string indicating as "%% EOF"". Note that the line break characters <CR><LF> are omitted in the termination code string "%% EOF" shown in FIG. 2(b), and an actual line is "<CR><LF>%% EOF<CR><LF>". Hereunder, the PDF file and the EPS file may be referred to as a file.

As shown in FIG. 1, the image forming apparatus 10 includes a reception buffer 101; a reception status storage unit 102; an internal processing information storage unit 103; a mode specifying information storage unit 104; a termination code string comparison table 105; a pointer storage unit 106; a counter number storage unit 107; a reception timeout detection counter 108; an operation panel unit 109; a reception control unit 110; a decode processing unit 111; an edition/deployment processing unit 112; and a print processing unit 113.

In the embodiment, the reception control unit 110, the decode processing unit 111, the edition/deployment processing unit 112, and the print processing unit 113 are created when a control program stored in an ROM (not shown) is executed with a CPU (not shown), and provide functions described later.

In the embodiment, the reception buffer 101 is disposed in an RAM (not shown) for storing the print data, a control code, and the termination code written in the print job received from a PC; the header data, the print data, a control code, and the termination code string written in the PDF file; and the header data, the print data, and the termination code string written in the EPS file. Hereunder, the print data, the control code, and the header date may be referred to as data. If necessary, the data are specified for explaining a configuration or an operation.

In the embodiment, the reception status storage unit 102 is disposed in the RAM for storing information (reception status information) indicating a reception status of the data from the PC. The reception status information includes a data reception waiting status of waiting for a reception of the data and a data reception status of receiving the data.

In the embodiment, the internal processing information storage unit 103 is disposed in the RAM for storing internal processing information indicating an internal processing status. The internal processing information includes a mode analysis status when the decode processing unit 111 analyzes the data and a continuous reception status of receiving the print data continuously written in the print job.

In the embodiment, the internal processing information storage unit 103 is disposed in the RAM for storing mode specifying information to specify whether the data received form the host device are processed in a normal mode or a termination code string detection mode.

In the normal mode, the data are not received for a specific period of time after a specific period of time is elapsed until next data are received. In the termination code string detection mode, the termination code written at the end portion of the print job, or the termination code string of the file is detected.

FIG. 3 is a schematic view showing the termination code string comparison table 105 according to the first embodiment of the present invention. In the embodiment, the termination code string comparison table 105 is disposed in a non-volatile memory such as a flash memory (not shown) for storing a first termination code string, a second termination code string, and a third termination code string. The first termination code string is a termination code string of a termination code (UEL code) written in the PJL. The second termination code string is a termination code string of a termination code (CTRL-D code) of the print job written in the PDL. The third termination code string is a termination code string of the PDF file and the EPS file. The third termination code string of the PDF file and the EPS file has a termination code string of "<CR><LF>%% EOF<CR><LF>".

Figure 4:
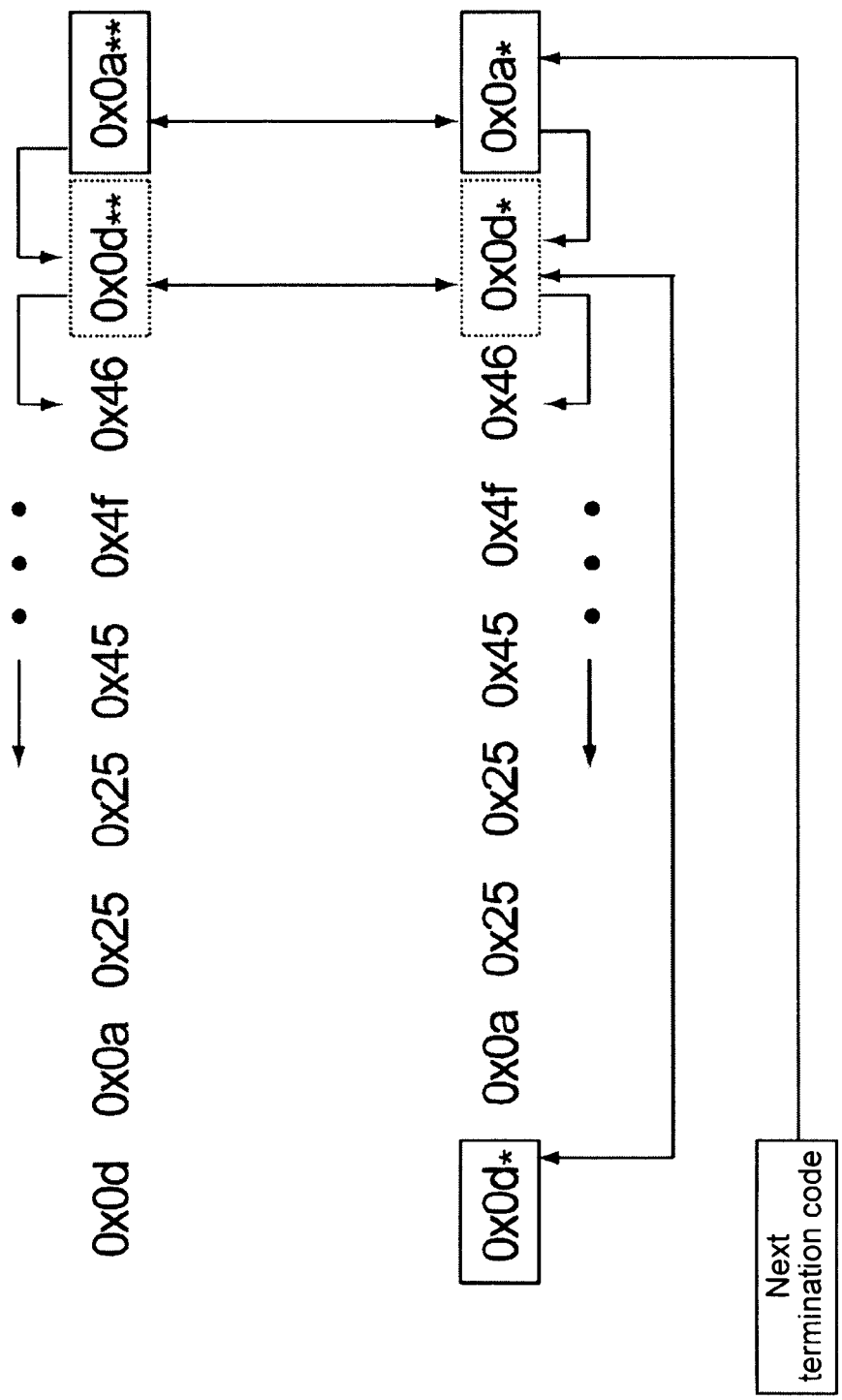
FIG. 4 is a schematic view showing a method of detecting a termination code according to the first embodiment of the present invention.

FIG. 4 is a schematic view showing a method of detecting the termination code according to the first embodiment of the present invention. As shown in FIG. 4, the third termination code string "<CR><LF>%% EOF<CR><LF>" of the PDF file and the EPS file are represented as "0x0d", "0x0a", "0x25", "0x25", "0x45", "0x4f", "0x46", "0x0d", and "0x0a". "0x0d" and "0x0a" represent the brake characters <CR><LF>; "0x25" represents "%"; "0x45" represents "E"; "0x4f" represents "O"; and "0x46" represents "F". Each of the characters is formed of one byte.

In the embodiment, the pointer storage unit 106 is disposed in the RAM for storing a reference pointer, a comparison destination pointer, and a comparison origination pointer. The reference pointer, the comparison destination pointer, and the comparison origination pointer are used for comparing one of the first termination code string and the second termination code string in the termination code string comparison table 105 with the data stored in the reception buffer 101 and received most recently.

In the embodiment, the reference pointer is assigned to an address of a head letter of the text string constituting the first termination code string, the second termination code string, or the third termination code string stored in the termination code string comparison table 105. For example, in the example described above and shown in FIG. 4, the reference pointer is assigned to "0x0d*" (an expression indicating an address assigned to "0x0d") as the address assigned to "0x0d" of the line break character <CR>.

In the embodiment, the comparison destination pointer is assigned to an address of a last letter of the text string constituting the first termination code string, the second termination code string, or the third termination code string. For example, in the example described above and shown in FIG. 4, the reference pointer is assigned to "0x0a*" as the address assigned to "0x0a" of the line break character <LF>.

In the embodiment, the comparison origination pointer is assigned to an address of a last letter of the text string constituting the data stored in the reception buffer 101 most recently. For example, in the example described above and shown in FIG. 4, the reference pointer is assigned to "0x0a**" (an expression indicating an address assigned to "0x0a") as the address assigned to "0x0a" of the line break character <LF> as the last letter.

In the embodiment, the counter number storage unit 107 stores a timeout value as a standard for detecting timeout with the reception timeout detection counter 108. The reception timeout detection counter 108 counts every specific period of time according to a start request from the reception control unit 110. When the reception timeout detection counter 108 counts the timeout value stored in the counter number storage unit 107, the reception timeout detection counter 108 sends a notice indicating the timeout to the reception control unit 110.

In the embodiment, the operation panel unit 109 includes a display unit formed of a liquid crystal device for displaying an operational status and an operational content of the image forming apparatus 10, and an input unit formed of a pointing device such as a keyboard, a mouse, and the likes for inputting the operational content. An operator operates the display unit and the input unit to register the normal mode or the termination code string detection mode to the mode specifying information storage unit 104.

When the reception control unit 110 starts receiving data from the PC, the reception control unit 110 sets the count value of the reception timeout detection counter 108 to zero. After the reception control unit 110 stores the data thus received to the reception buffer 101, the reception control unit 110 sends a notice indicating the reception of the data to the decode processing unit 111. Afterward, every time when the reception control unit 110 receives data from the PC, after the reception control unit 110 stores the data thus received, the reception control unit 110 sends the notice indicating the reception of the data to the decode processing unit 111.

When the reception control unit 110 receives data and does not receive subsequent data, the reception control unit 110 determines whether the reception status information stored in the reception status storage unit 102 is the data reception status. When the reception control unit 110 determines that the reception status information is not the data reception status, the reception control unit 110 waits for a subsequent print job or subsequent data of a file. When the reception control unit 110 determines that the reception status information is the data reception status, the reception control unit 110 determines whether the mode specifying information stored in the mode specifying information storage unit 104 is the termination code string detection mode or the normal mode.

When the reception control unit 110 determines that the mode specifying information stored in the mode specifying information storage unit 104 is the termination code string detection mode, the reception control unit 110 performs a termination code string detection mode process (described later). When the reception control unit 110 determines that the mode specifying information stored in the mode specifying information storage unit 104 is the normal mode, the reception control unit 110 performs a normal mode process (described later). The termination code string detection mode process and the normal mode performed with the reception control unit 110 will be explained in a section of explaining an operation of the image forming apparatus 10.

Figure 5:
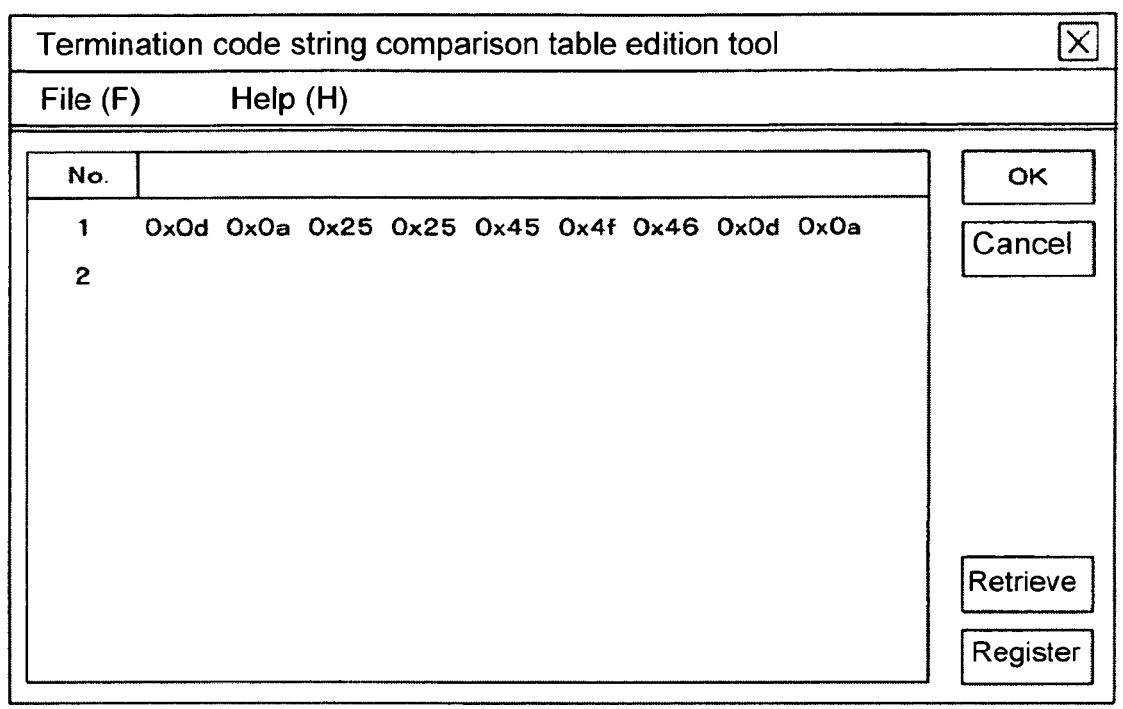
FIG. 5 is a schematic view showing an example of a termination code string comparison table edition tool screen according to the first embodiment of the present invention.

FIG. 5 is a schematic view showing an example of a termination code string comparison table edition tool screen according to the first embodiment of the present invention. The termination code string comparison table edition tool screen is used for the PC to register, change, or add the termination code string to the termination code string comparison table 105 of the image forming apparatus 10, or read the termination code string registered in the termination code string comparison table 105 of the image forming apparatus 10.

As shown in FIG. 5, the termination code string comparison table edition tool screen includes an OK button, a cancel button, a retrieve button, and a register button. When the retrieve button is clicked, the termination code string registered in the termination code string comparison table 105 of the image forming apparatus 10 is displayed on the screen. When the operator registers, changes, or adds the termination code string, a termination code string to be registered, changed, or added is displayed on the screen. Then, when the register button is clicked, the termination code string displayed on the screen is registered, changed, or added to the termination code string comparison table 105 of the image forming apparatus 10.

When the decode processing unit 111 receives the notice that the reception control unit 110 starts receiving the data from the PC, the decode processing unit 111 sets a command analysis status as the internal processing information in the internal processing information storage unit 103. Every time when the decode processing unit 111 receives the notice that the reception control unit 110 receives the data, the decode processing unit 111 reads the data written in the reception buffer 101 with the reception control unit 110, so that the decode processing unit 111 analyzes the data. When the data thus analyzed is the control code (control code described in the print job) for specifying a print data amount to be sent, the decode processing unit 111 sets a continuous transmission status as the internal processing information in the internal processing information storage unit 103.

When the decode processing unit 111 inputs an analysis result to the edition/deployment processing unit 112, the edition/deployment processing unit 112 retrieves the data from the reception buffer 101 according to the analysis result. When the data thus retrieved are the print data, the edition/deployment processing unit 112 converts the print data to raster data, and stores the raster data to a raster data storage unit (not shown). After the edition/deployment processing unit 112 stores the raster data to the raster data storage unit, the print processing unit 113 controls a subsequent process.

The print processing unit 113 sequentially retrieves the raster data stored in the raster data storage unit, and prints on the print medium using the raster data.

Figure 6:
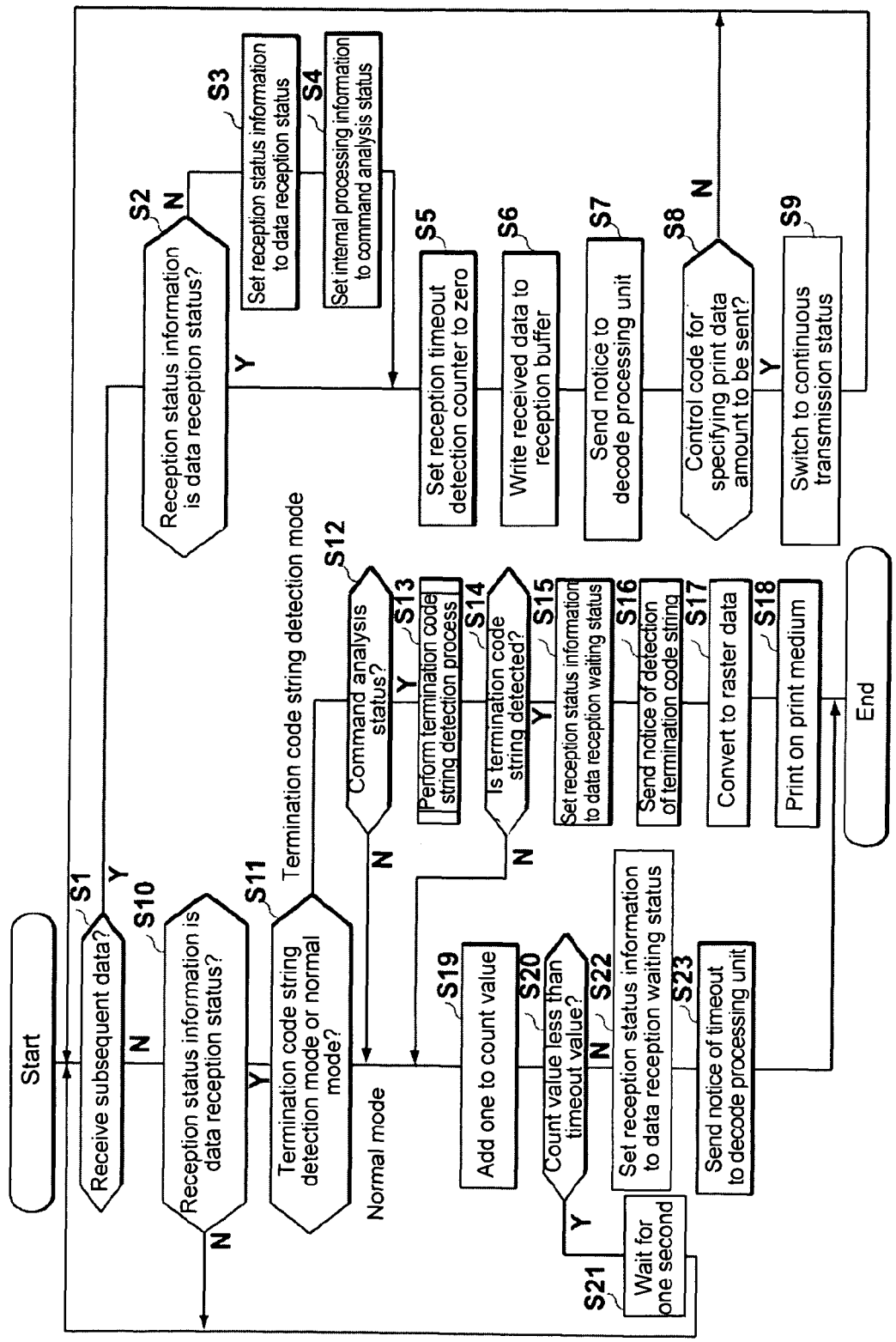
FIG. 6 is a flow chart showing an operation of the image forming apparatus according to the first embodiment of the present invention.

An operation of the image forming apparatus 10 will be explained next. FIG. 6 is a flow chart showing the operation of the image forming apparatus 10 according to the first embodiment of the present invention.

In step S1, after the reception control unit 110 receives the data of the print job described with the PJL or the PDL, or the data of the PDF file or the EPS file, the reception control unit 110 determines whether the subsequent data are received. In step S2, when the reception control unit 110 determines that the subsequent data are received, the reception control unit 110 retrieves the reception status information stored in the reception status storage unit 102. Then, the reception control unit 110 determines whether the reception status information thus retrieved is the data reception status.

In step S3, when the reception control unit 110 determines that the reception status information thus retrieved is not the data reception status, the reception control unit 110 sets the reception status information to the data reception status. Then, the reception control unit 110 sends the notice indicating the reception of the data to the decode processing unit 111.

In step S4, when the decode processing unit 111 receives the notice from the reception control unit 110, the decode processing unit 111 sets the internal processing information in the internal processing information storage unit 103 to the command analysis status. In step S5, when the reception control unit 110 determines that the reception status information thus retrieved is the data reception status in step S2, the reception control unit 110 sets the reception timeout detection counter 108 to zero. In step S6, the reception control unit 110 writes the data received from the PC to the reception buffer 101. In step S7, the reception control unit 110 sends the notice indicating the reception of the data to the decode processing unit 111.

In step S8, when the decode processing unit 111 receives the notice from the reception control unit 110, the decode processing unit 111 reads the data written in the reception buffer 101 most recently, and determines whether the data thus read is the control code for specifying the print data amount to be sent. When the decode processing unit 111 determines that the data read from the reception buffer 101 is not the control code, the process returns to step S1, thereby repeating the process described above.

In step S9, when the decode processing unit 111 determines that the data is the control code, the decode processing unit 111 switches the command analysis status stored in the internal processing information storage unit 103 to the continuous transmission status, and the process returns to step S1, thereby repeating the process described above.

In step S10, when the reception control unit 110 determines that the subsequent data are not received, the reception control unit 110 determines whether the reception status information stored in the reception status storage unit 102 is the data reception status. When the reception control unit 110 determines that the reception status information stored in the reception status storage unit 102 is not the data reception status, that is, the PC does not send the print job or the data of the file, the process returns to step S1, thereby repeating the process described above.

In step S11, when the reception control unit 110 determines that the reception status information stored in the reception status storage unit 102 is the data reception status, the reception control unit 110 retrieves the mode specifying information from the mode specifying information storage unit 104.

Then, the reception control unit 110 determines whether the mode specifying information thus retrieved is the termination code string detection mode or the normal mode.

When the reception control unit 110 determines that the reception control unit 110 receives the data of the PDF file or the EPS file from the PC and does not receives the subsequent data, and the reception status information stored in the reception status storage unit 102 is the data reception status, the data received most recently become a subject for detecting the termination code string.

In step S12, when the reception control unit 110 determines that the mode specifying information thus retrieved is the termination code string detection mode (in step S1, the termination code string detection mode), the reception control unit 110 determines whether the command analysis status is stored in the internal processing information storage unit 103 as the internal processing information. When the reception control unit 110 determines that the command analysis status is not stored in the internal processing information storage unit 103, that is, the continuous transmission status is stored in the internal processing information storage unit 103, the process proceeds to step S19.

When the reception control unit 110 determines that the command analysis status is not stored in the internal processing information storage unit 103, that is, the continuous transmission status is stored in the internal processing information storage unit 103, the data received from the PC are data of the print job, i.e., the print data.

Figure 7:
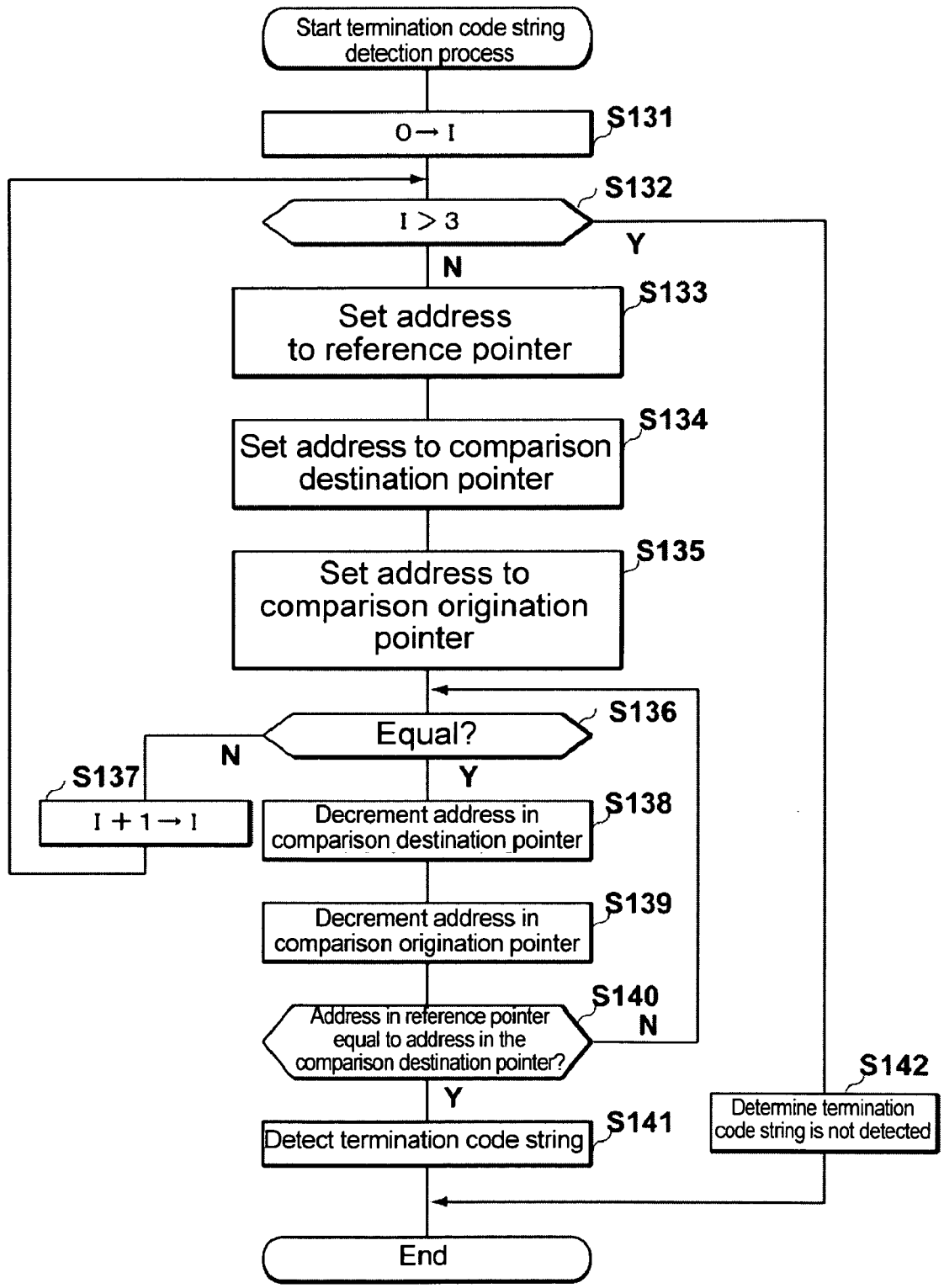
FIG. 7 is a flow chart showing a process of detecting the termination code string in step S13 shown in FIG. 6 according to the first embodiment of the present invention.

In step S13, when the reception control unit 110 determines that the command analysis status is stored in the internal processing information storage unit 103 as the internal processing information, the reception control unit 110 performs the termination code string detection process indicated with a flow chart shown in FIG. 7 (described later).

When the reception control unit 110 determines that the command analysis status is stored in the internal processing information storage unit 103, and the data received from the PC are the data of the PDF file or the EPS file, the data thus received are the last data, and become a subject for detecting the termination code string. Further, when the data received from the PC are the data of the print job described in the PJL or the PDL, the data are the termination code.

In step S14, after the termination code string detection process, the reception control unit 110 determines whether the termination code is detected. When the reception control unit 110 determines that the termination code is not detected, the process proceeds to step S19. In step S15, when the reception control unit 110 determines that the termination code is detected, the reception control unit 110 sets the reception status information stored in the reception status storage unit 102 to the data reception waiting status. In step S16, the reception control unit 110 sends the notice of the detection of the termination code string to the decode processing unit 111.

When the decode processing unit 111 receives the notice from the reception control unit 110, the decode processing unit 111 sends the analysis result to the edition/deployment processing unit 112. When the decode processing unit 111 inputs the analysis result to the edition/deployment processing unit 112, the edition/deployment processing unit 112 retrieves the data from the reception buffer 101 according to the analysis result. In step S17, when the data thus retrieved are the print data, the edition/deployment processing unit 112 converts the print data to the raster data, and stores the raster data to the raster data storage unit (not shown). Then the print processing unit 113 controls the subsequent process.

In step S18, the print processing unit 113 sequentially retrieves the raster data stored in the raster data storage unit, and prints on the print medium using the raster data, thereby completing the process.

In step 19, when the reception control unit 110 determines that the mode specifying information stored in the mode specifying information storage unit 104 is the normal mode in step S11, the reception control unit 110 adds one to the count value counted in the reception timeout detection counter 108. In step S20, the reception control unit 110 determines whether the count value counted in the reception timeout detection counter 108 is less than the timeout value stored in the counter number storage unit 107. In step S21, when the reception control unit 110 determines that the count value is less than the timeout value, the reception control unit 110 waits for one second, and the process returns to step S1, thereby repeating the process described above.

In step S22, when the reception control unit 110 determines that the count value is greater than the timeout value, the reception control unit 110 sets the reception status information stored in the reception status storage unit 102 to the data reception waiting status. In step S23, the reception control unit 110 sends the notice of the timeout to the decode processing unit 111, thereby completing the process.

The process of detecting the termination code string in step S13 will be explained next. FIG. 7 is a flow chart showing the process of detecting the termination code string in step S13 shown in FIG. 6 according to the first embodiment of the present invention.

In step S131, when the reception control unit 110 determines that the internal processing information stored in the internal processing information storage unit 103 is set to the command analysis status in step S12, the reception control unit 110 sets zero to a number I stored in the RAM (not shown). In step S132, the reception control unit 110 determines whether the number I is greater than three. The number I is a number of the termination code string stored in the termination code string comparison table 105. In the embodiment, as shown in FIG. 3, the first to third termination code strings are stored.

In step S133, when the reception control unit 110 determines that the number I is less than three, the reception control unit 110 sets the address assigned to the head letter of the I-th (I=1 Or 2) termination code string stored in the termination code string comparison table 105 to the reference pointer in the pointer storage unit 106. For example, when the I-th (I=3) termination code string is represented as "0x0d 0x0a 0x25 0x25 0x45 0x4f 0x46 0x0d 0x0a" as shown in FIG. 4, the address "0x0d*" assigned to the head letter "0x0d" of the I-th termination code string is set to the reference pointer of the pointer storage unit 106.

In step S134, the reception control unit 110 sets the address assigned to the last letter of the I-th termination code string to the comparison destination pointer in the pointer storage unit 106. In the example described above, the address "0x0a*" assigned to the last letter "0x0d" of the I-th termination code string is set to the comparison destination pointer of the pointer storage unit 106.

In step S135, the reception control unit 110 sets the address assigned to the last letter of the data stored in the reception buffer 101 most recently to the comparison origination pointer in the pointer storage unit 106. In the example described above, the address "0x0a**" assigned to the last letter of the data stored in the reception buffer 101 most recently is set to the comparison origination pointer.

In step S136, the reception control unit 110 compares and determines whether the letter described in the address specified by the comparison destination pointer of the pointer storage unit 106 is equal to the letter described in the address specified by the comparison origination pointer. In step S137, when the reception control unit 110 determines that the letter described in the address specified by the comparison destination pointer of the pointer storage unit 106 is not equal to the letter described in the address specified by the comparison origination pointer, the reception control unit 110 adds one to the number I stored in the RAM, and the process returns to step S132, thereby repeating the process described above.

In step S138, when the reception control unit 110 determines that the letter described in the address specified by the comparison destination pointer of the pointer storage unit 106 is equal to the letter described in the address specified by the comparison origination pointer, the reception control unit 110 writes the address one before the address previously written in the comparison destination pointer of the pointer storage unit 106. In the example described above, the address "0x0d" of the I-th termination code string is set to the comparison destination pointer of the pointer storage unit 106.

In step S139, the reception control unit 110 writes the address one before the address previously written in the comparison origination pointer of the pointer storage unit 106. In the example described above, the address "0x0d" of the reception buffer 101 is set to the comparison origination pointer of the pointer storage unit 106.

In step S140, the reception control unit 110 determines whether the head address stored in the reference pointer of the pointer storage unit 106 is equal to the address stored in the comparison destination pointer. When the reception control unit 110 determines that the head address stored in the reference pointer is different from the address stored in the comparison destination pointer, the process returns to step S136, thereby repeating the process described above.

In step S141, when the reception control unit 110 determines that the head address stored in the reference pointer is equal to the address stored in the comparison destination pointer, the reception control unit 110 detects the termination code string, and sends the notice of the detection of the termination code string to the decode processing unit 111, thereby completing the process.

In step S142, when the reception control unit 110 determines that the number I is greater than three in step S132, that is, determines that there is no subsequent termination code string, the reception control unit 110 determines that the termination code string is not detected, and sends the notice of the non-detection of the termination code string to the decode processing unit 111, thereby completing the process of detecting the termination code string.

As described above, in the embodiment, when the reception control unit 110 does not receive the data from the PC, the reception status information stored in the reception status storage unit 102 is the data reception status, and the mode specifying information stored in the mode specifying information storage unit 104 is the termination code string detection mode, the reception control unit 110 recognizes the data thus received as the candidate of the termination code string.

Then, the reception control unit 110 compares the candidate of the termination code string with the termination code string registered in the termination code string comparison table 105. When the termination code string matching to the candidate of the termination code string is registered in the termination code string comparison table 105, the reception control unit 110 determines that the candidate of the termination code string thus detected is the termination code string. Accordingly, it is possible to start the printing operation without waiting the reception timeout. As a result, even when the PDF file or the EPS file is received from the host device through the direct printing function, it is possible to reduce the printing start time of the file.

Conventionally, the PDF file or the EPS file sent from the host device is wrapped with the PJL using a file transmission utility, so that the image forming apparatus can recognize the termination code as the PJL. In wrapping the file, "@PJL ENTER LANGULAGE" is added to the head portion, and the UEL code is added to the end portion as the termination code. In the embodiment, the reception control unit 110 determines that the candidate of the termination code string is the termination code string. Accordingly, it is possible to eliminate the step of wrapping with the PJL.

Second Embodiment

Figure 8:
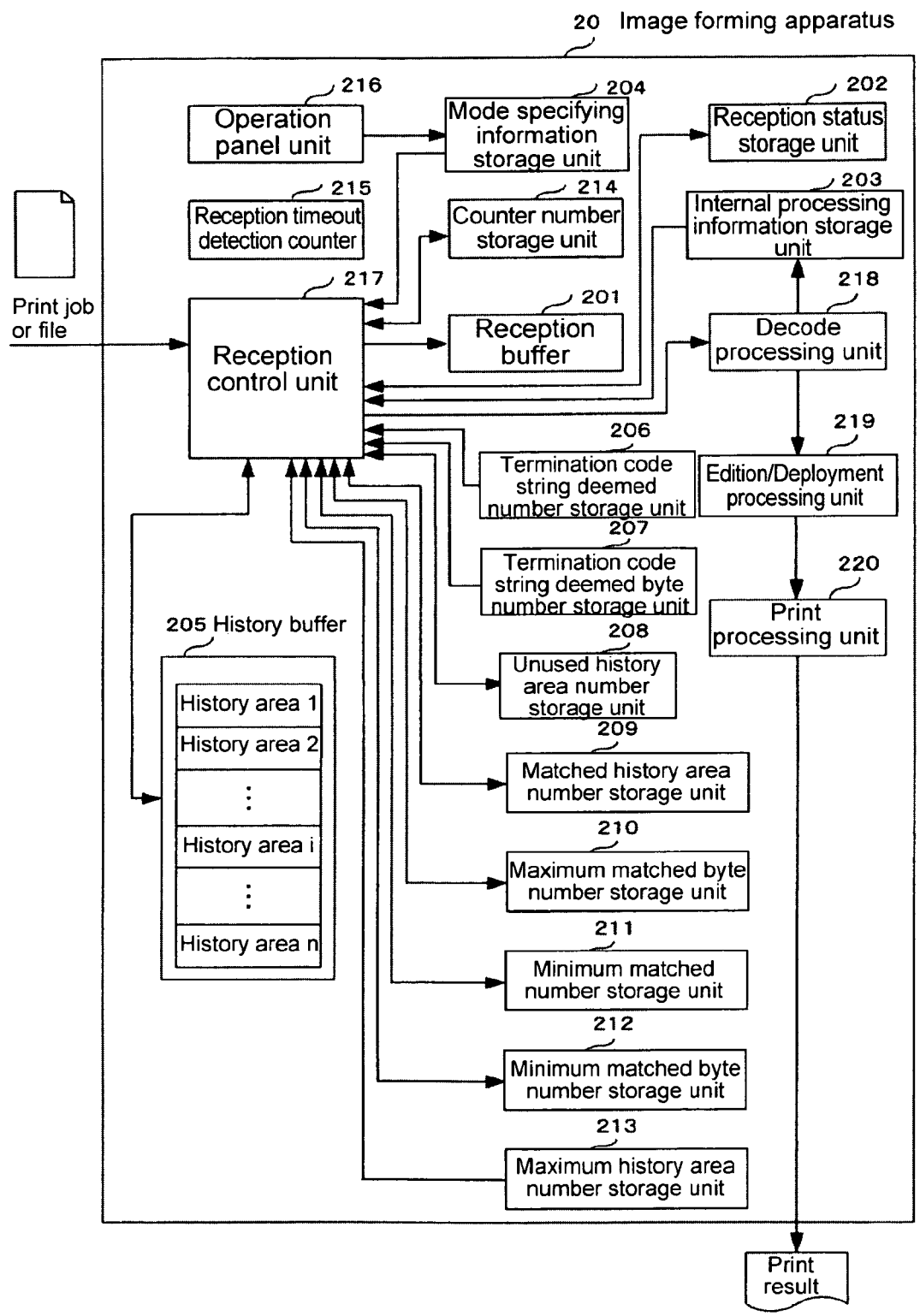
FIG. 8 is a block diagram showing a configuration of an image forming apparatus according to a second embodiment of the present invention.

A second embodiment of the present invention will be explained. FIG. 8 is a block diagram showing a configuration of an image forming apparatus 20 according to the second embodiment of the present invention.

In the second embodiment, similar to the image forming apparatus 10 in the first embodiment, the image forming apparatus 20 is configured to print on the print medium using the print job received form the PC as the host device and written in the PJL (Printer Job Language) or the PDL (Page Description Language). Further, the image forming apparatus 20 is configured to print on the print medium using the print data written in the PDF (Portable Document Format) file or the ESP (Encapsulated Post Script) file.

As shown in FIG. 8, the image forming apparatus 20 includes a reception buffer 201; a reception status storage unit 202; an internal processing information storage unit 203; a mode specifying information storage unit 204; a history buffer 205; a termination code string deemed number storage unit 206; a termination code string deemed byte number storage unit 207; a unused history area number storage unit 208; a matched history area number storage unit 209; a maximum matched byte number storage unit 210; a minimum matched number storage unit 211; a minimum matched byte number storage unit 212; a maximum history area number storage unit 213; a count number storage unit 214; a reception timeout detection counter 215; an operation panel unit 216; a reception control unit 217; a decode processing unit 218; an edition/deployment processing unit 219; and a print processing unit 220.

In the embodiment, the reception control unit 217, the decode processing unit 218, the edition/deployment processing unit 219, and the print processing unit 220 are created when a control program stored in an ROM (not shown) is executed with a CPU (not shown), and provide functions described later.

In the embodiment, the maximum matched byte number storage unit 210, the reception status storage unit 202, the internal processing information storage unit 203, the mode specifying information storage unit 204, the count number storage unit 214, the reception timeout detection counter 215, the operation panel unit 216, the decode processing unit 218, the edition/deployment processing unit 219, and the print processing unit 220 have configurations similar to those in the first embodiment, respectively.

Figure 9:
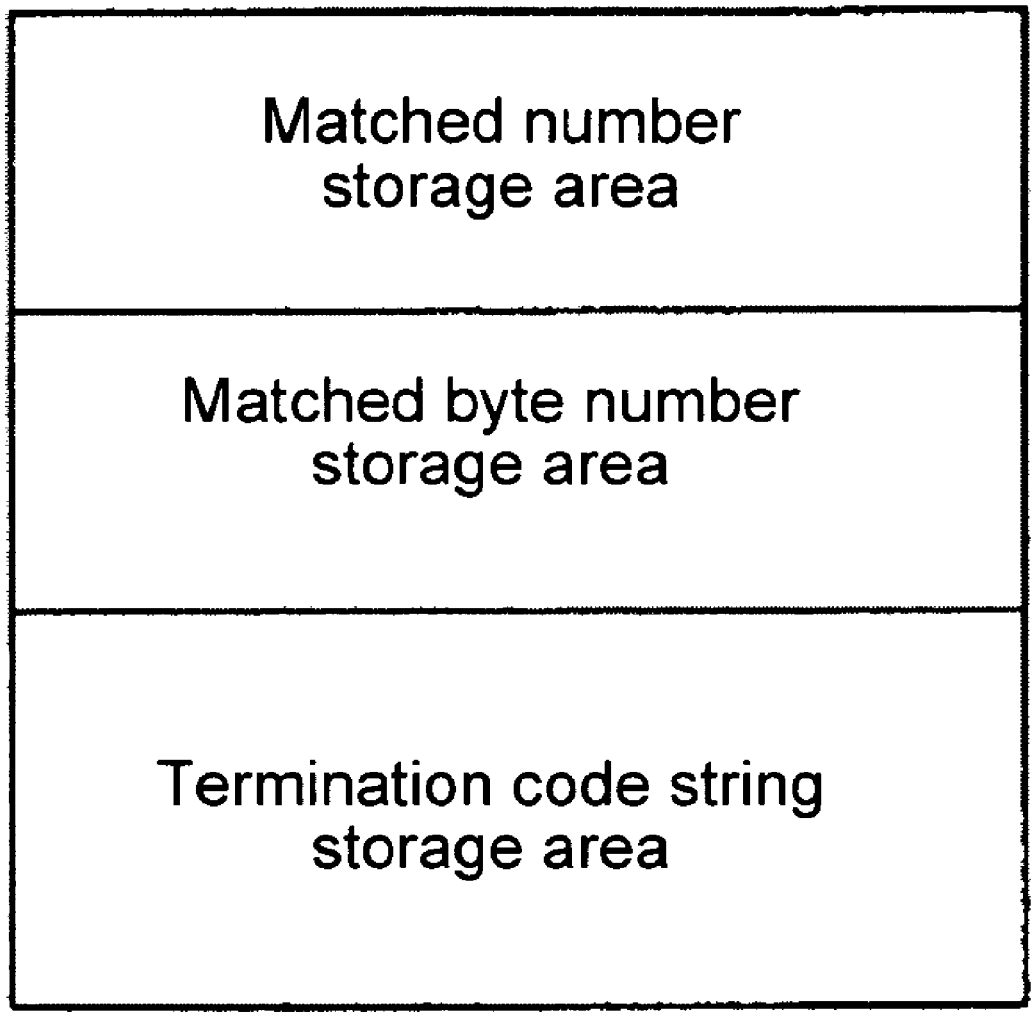
FIG. 9 is a schematic view showing a history area shown in FIG. 8 according to the first embodiment of the present invention.

FIG. 9 is a schematic view showing a history area shown in FIG. 8 according to the first embodiment of the present invention. The history buffer 205 includes a history area 0 to a history area n.

As shown in FIG. 9, each of the history areas i (i=0, 1, ..., n) includes a matched number storage area for storing a matched number; a matched byte number storage unit for storing a matched byte number; and a termination code string storage unit for storing a termination code string.

In the embodiment, the matched number stored in the matched number storage area, the matched byte number stored in the matched byte number storage unit, and the termination code string stored in the termination code string storage unit represent a history of data received most recently in the termination code string detection mode when the timeout occurs. Note that the termination code string storage unit can store the termination code string having a byte number registered in the termination code string deemed byte number storage unit 207.

In the embodiment, a matched number is a criteria for determining whether the reception control unit 217 compares the data stored in the reception buffer 201 most recently with the termination code string stored in the history area i of the history buffer 205. More specifically, when the matched number is greater than a number (termination code string deemed number) stored in the termination code string deemed number storage unit 206, the reception control unit 217 compares the data stored in the reception buffer 201 most recently with the termination code string stored in the history area i. Otherwise, the reception control unit 217 does not compare.

In the embodiment, a matched byte number is a criteria for determining whether the reception control unit 217 compares the data stored in the reception buffer 201 most recently with the termination code string stored in the history area i of the history buffer 205. More specifically, when the matched byte number is greater than a number (termination code string deemed byte number) stored in the termination code string deemed byte number storage unit 207, the reception control unit 217 compares the data stored in the reception buffer 201 most recently with the termination code string stored in the history area i. Otherwise, the reception control unit 217 does not compare.

In the embodiment, the termination code string deemed number storage unit 206 stores the termination code string deemed number. The termination code string deemed byte number storage unit 207 stores the termination code string deemed byte number. The unused history area number storage unit 208 stores a number (unused history area number) of the history area i in the history buffer 205 in an unused state. Note that when the unused history area number is −1, all of the history areas from the history area 0 to the history area n are used.

In the embodiment, the matched history area number storage unit 209 stores the termination code string to be registered and the number specifying the history area i storing the termination code string partially matched in the history buffer 205. When the matched history area number storage unit 209 stores −1, there are not the termination code string to be registered and the history area i storing the termination code string partially matched.

In the embodiment, the maximum matched byte number storage unit 210 stores a byte number (maximum matched byte number) to be stored in the matched byte number stored in the history buffer 205. The maximum matched byte number is the byte number matched between the data stored in the reception buffer 201 most recently and the termination code string corresponding thereto.

In the embodiment, the minimum matched number storage unit 211 stores a minimum matched number as information for the reception control unit 217 to determine the history area i where the data stored in the reception buffer 201 most recently is stored as the termination code string from the history area 0 to the history area n when the history buffer 205 does not have an empty history area. More specifically, when the history area i of the history buffer 205 stores the matched number smaller than the minimum matched number stored in the minimum matched number storage unit 211, the reception control unit 217 determines the history area i as a candidate where the data stored in the reception buffer 201 most recently is stored as the termination code string.

In the embodiment, the maximum history area number storage unit 213 stores a maximum number (maximum history area number) of the history area created in the RAM and capable of being created in the history buffer 205. As shown in FIG. 8, the history buffer 205 has the maximum history area number of n.

Figure 10:
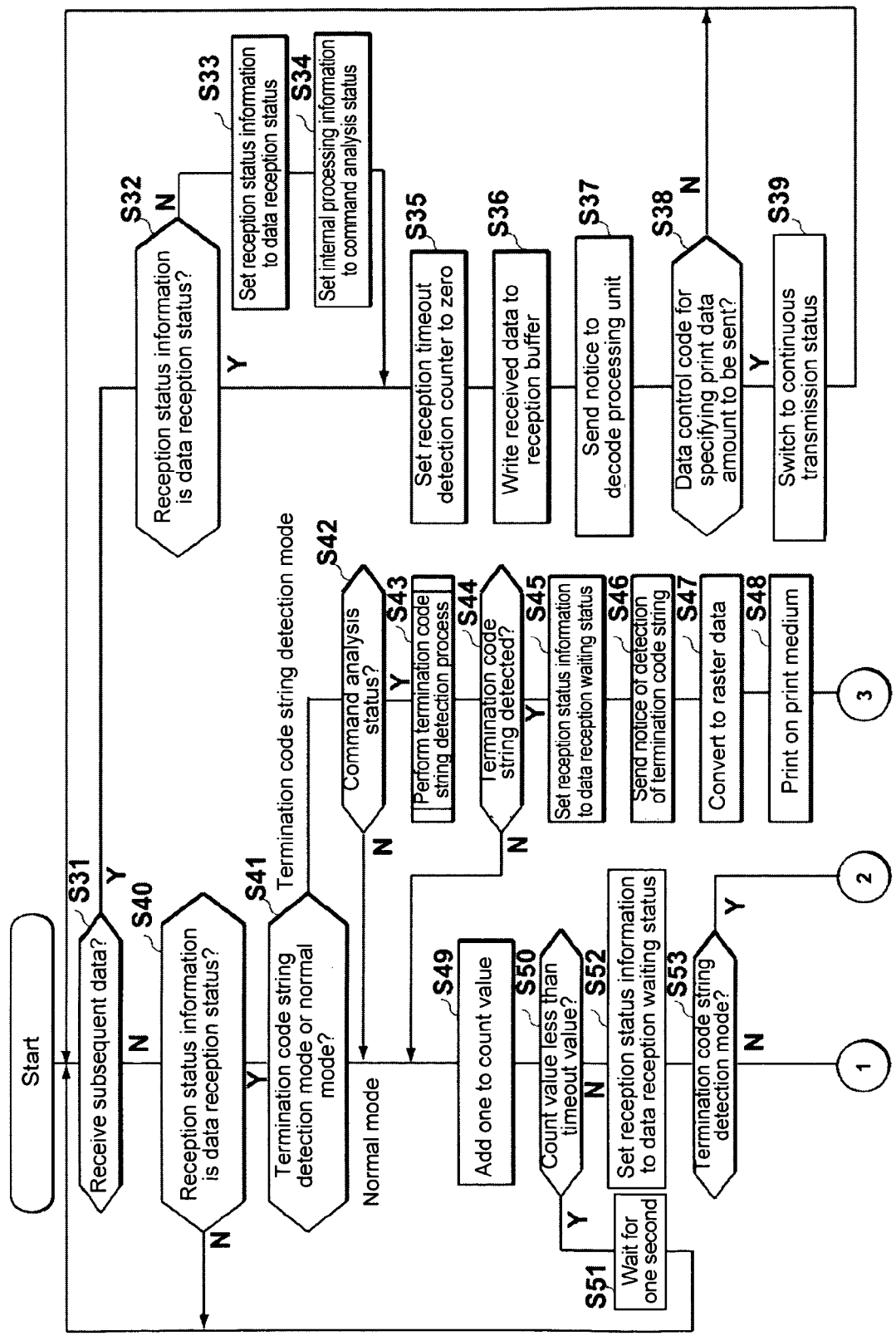
FIG. 10 is a flow chart No. 1 showing an operation of the image forming apparatus according to the second embodiment of the present invention.
Figure 11:
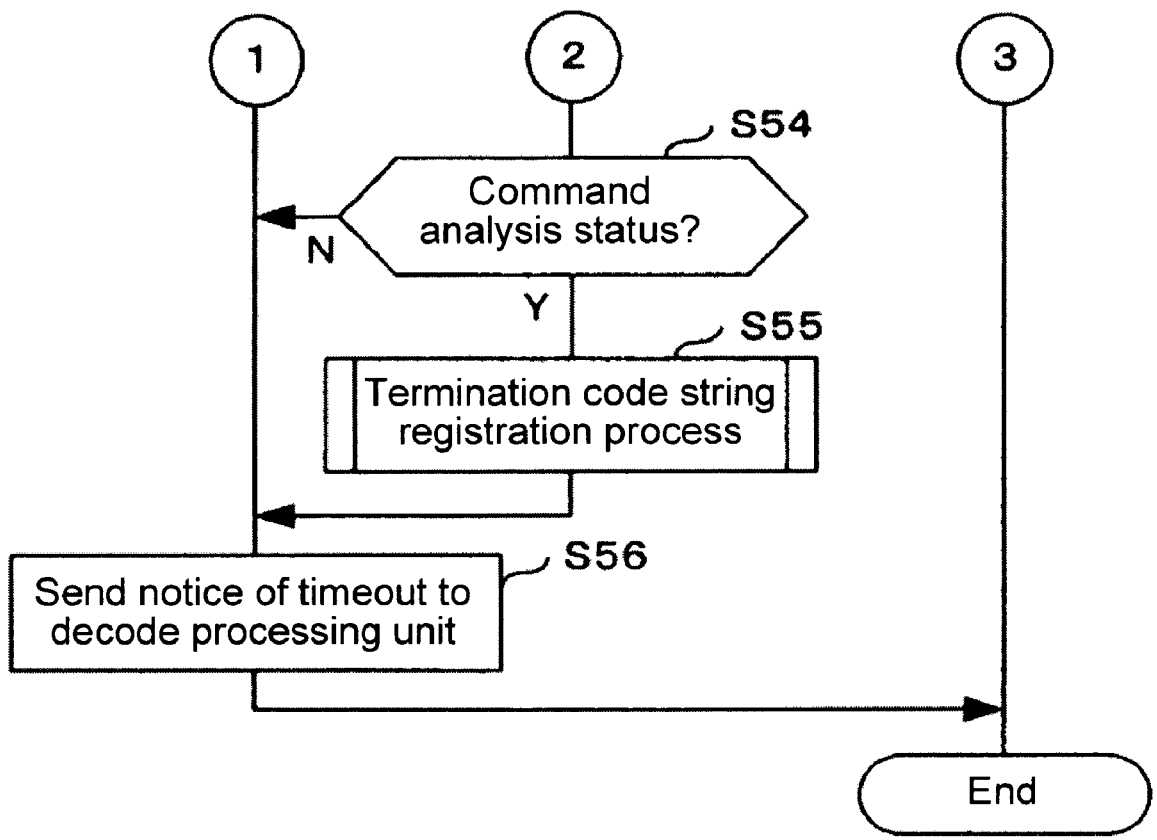
FIG. 11 is a flow chart No. 2 showing the operation of the image forming apparatus according to the second embodiment of the present invention.

An operation of the image forming apparatus 20 will be explained next. FIG. 10 is a flow chart No. 1 showing an operation of the image forming apparatus 20 according to the second embodiment of the present invention. FIG. 11 is a flow chart No. 2 showing the operation of the image forming apparatus 20 according to the second embodiment of the present invention.

Figure 12:
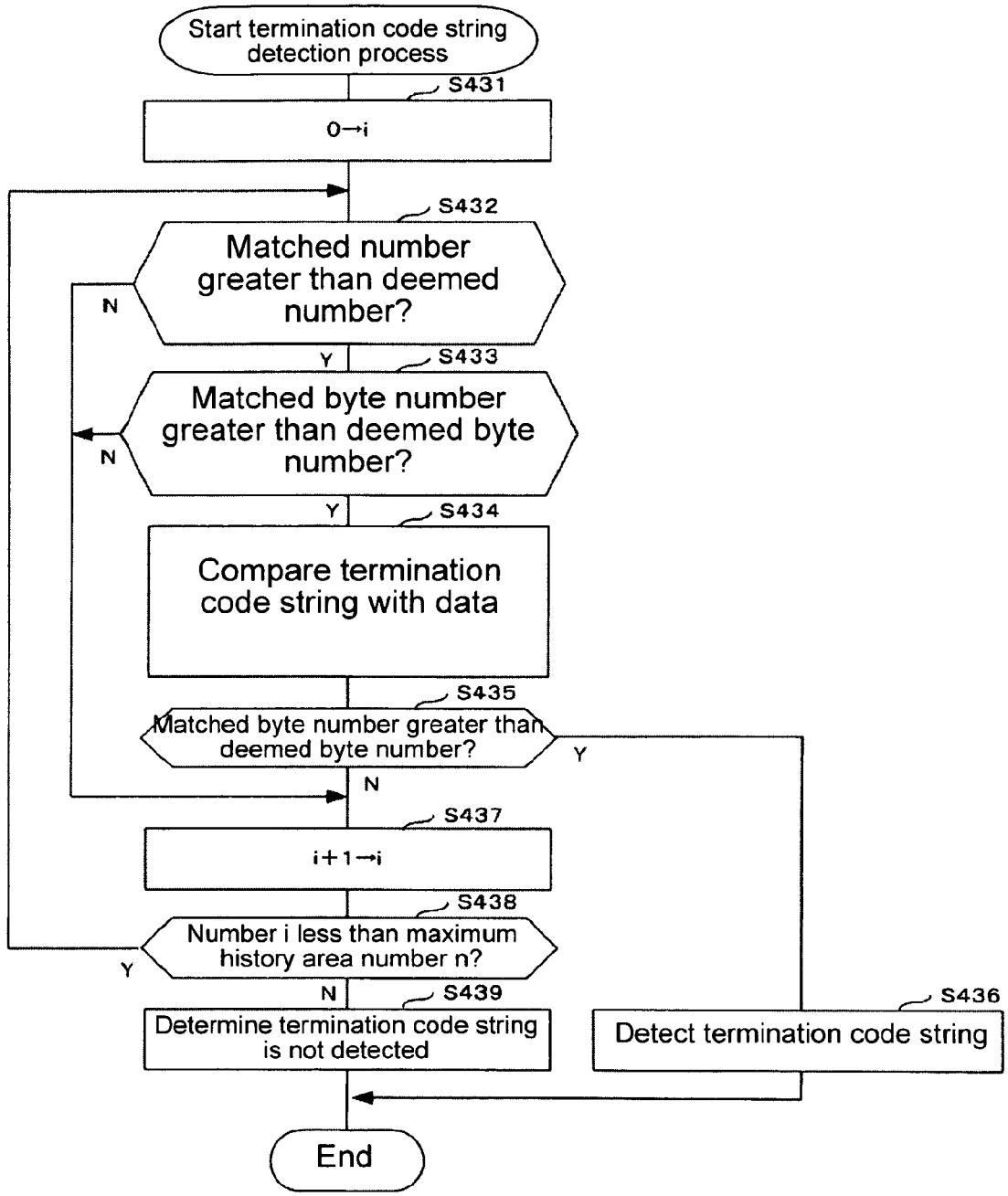
FIG. 12 is a flow chart showing a process of detecting the termination code string in step S43 shown in FIG. 10 according to the second embodiment of the present invention.
Figure 13:
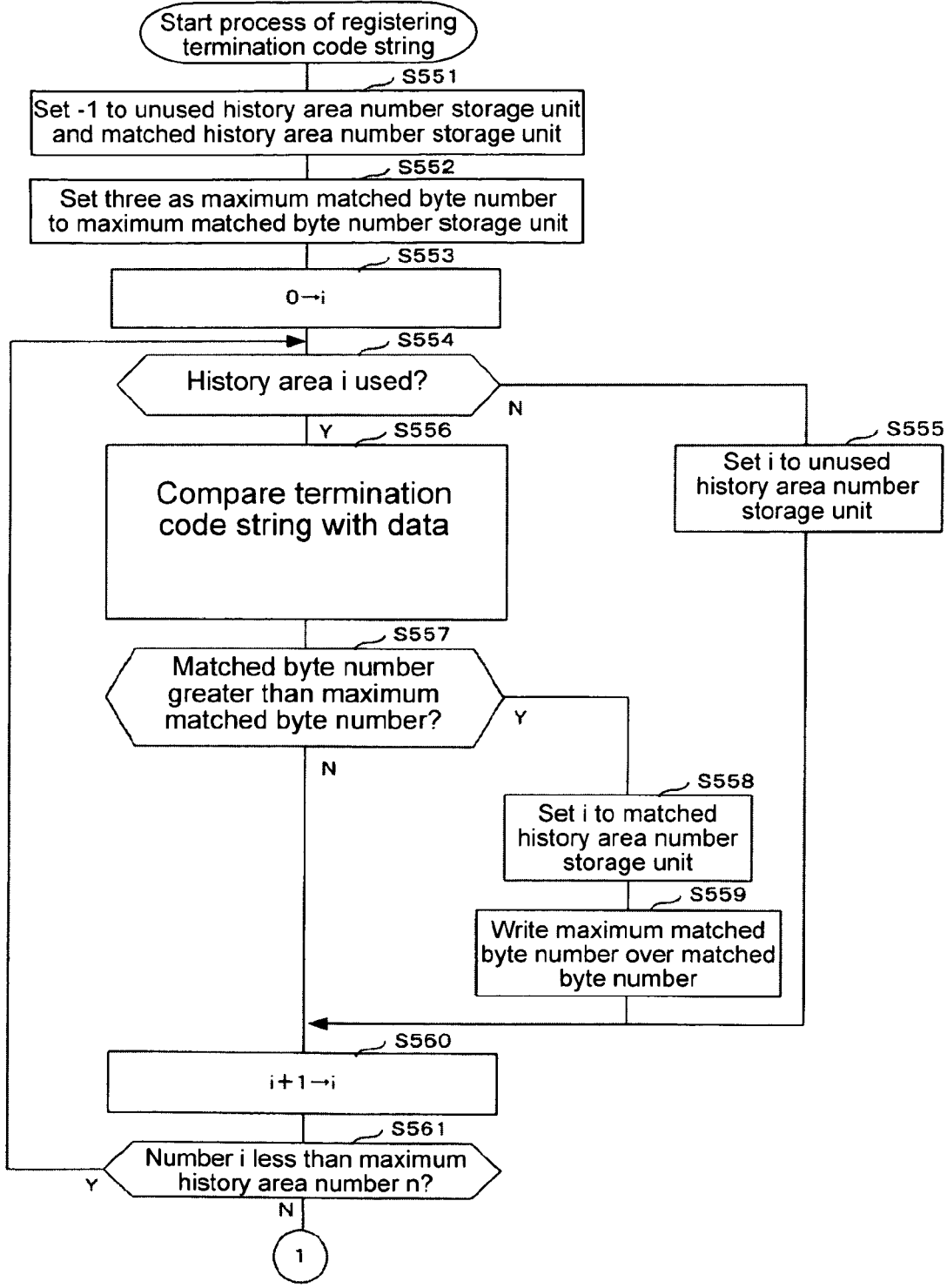
FIG. 13 is a flow chart No. 1 showing a process of registering the termination code string in step S55 shown in FIG. 11 according to the second embodiment of the present invention.
Figure 14:
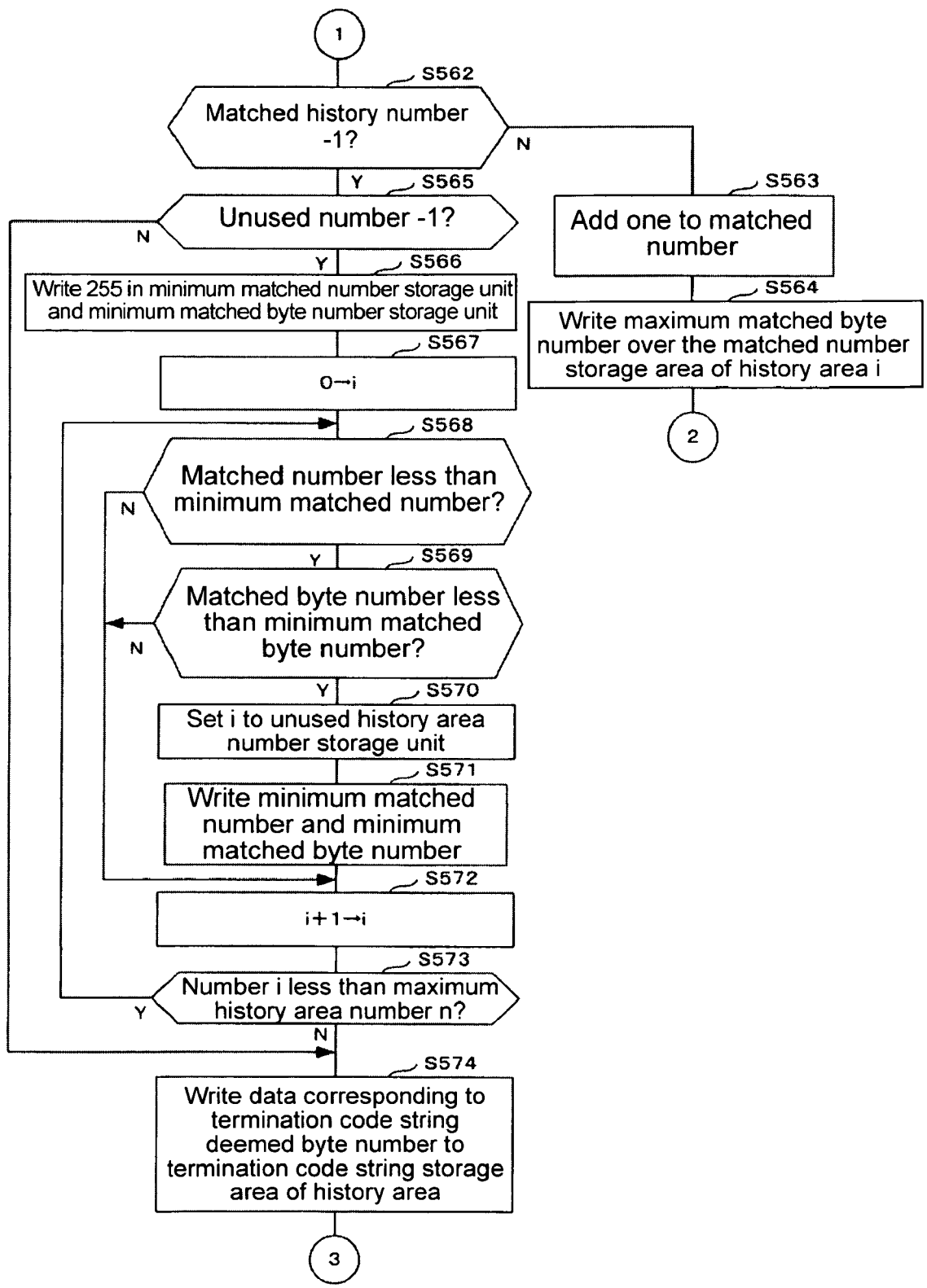
FIG. 14 is a flow chart No. 2 showing the process of registering the termination code string in step S55 shown in FIG. 11 according to the second embodiment of the present invention.
Figure 15:
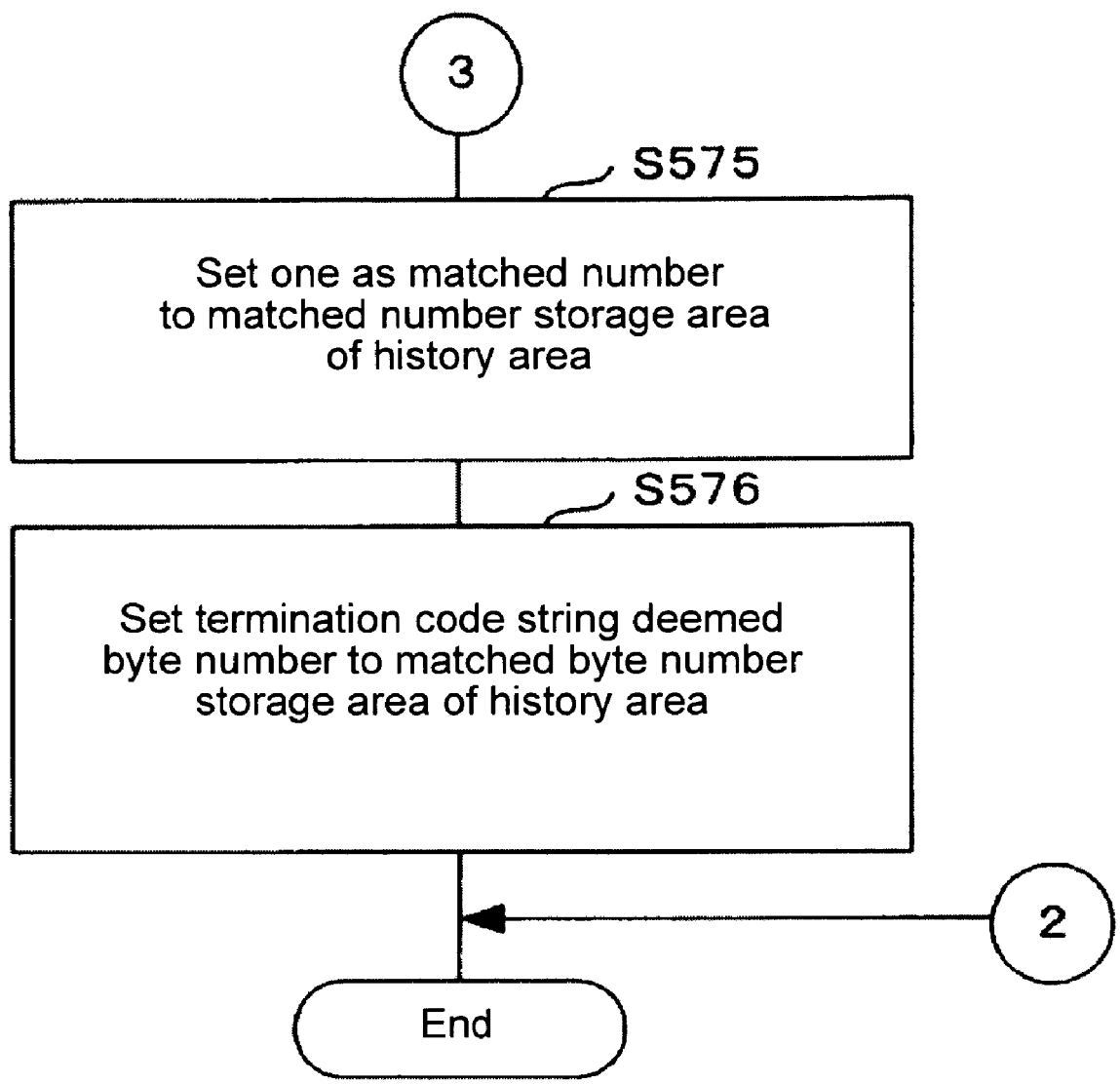
FIG. 15 is a flow chart No. 3 showing the process of registering the termination code string in step S55 shown in FIG. 11 according to the second embodiment of the present invention.

In the embodiment, the reception control unit 217 performs a process similar to that of the reception control unit 110 in the first embodiment, except the termination code string detection process shown in FIG. 12, and the termination code string registration process shown in FIGS. 13 to 15 (described later).

A process from step S31 to step S42 is similar to the process from step S1 to S12 in the first embodiment. In step S31, after the reception control unit 217 receives the data of the print job described with the PJL or the PDL, or the data of the PDF file or the EPS file, the reception control unit 217 determines whether the subsequent data are received. In step S42, the reception control unit 217 determines whether the internal processing information stored in the internal processing information storage unit 203 is the command analysis status. When the reception control unit 217 determines whether the internal processing information stored in the internal processing information storage unit 203 is not the command analysis status, the process proceeds to step S49.

In step S43, when the reception control unit 217 determines that the internal processing information stored in the internal processing information storage unit 203 is the command analysis status, the reception control unit 217 performs the termination code string detection process indicated with the flow chart shown in FIG. 12 (described later).

A process from step S44 to step S48 is similar to the process from step S14 to S18 in the first embodiment. In step S44, the reception control unit 217 determines whether the termination code is detected. In step S48, the print processing unit 220 prints on the print medium using the print data of the print job or the print data of the file.

A process from step S41 to step S52 is similar to the process from step S11 to S22 in the first embodiment. In step S41, the reception control unit 217 determines that the mode specifying information stored in the mode specifying information storage unit 204 is the normal mode. In step S52, the reception control unit 217 sets the reception status information stored in the reception status storage unit 202 to the data reception waiting status.

In step S53, after the reception control unit 217 sets the reception status information stored in the reception status storage unit 202 to the data reception waiting status, the reception control unit 217 determines whether the mode specifying information stored in the mode specifying information storage unit 204 is the termination code string detection mode. In step S54, when the reception control unit 217 determines that the mode specifying information stored in the mode specifying information storage unit 204 is not the termination code string detection mode, the reception control unit 217 determines whether the reception status information stored in the reception status storage unit 202 is the command analysis status.

When the reception control unit 217 determines that the reception status information stored in the reception status storage unit 202 is not the command analysis status, that is, the reception status information is the continuous reception status, the process proceeds to step S56. When the reception control unit 217 determines that the reception status information stored in the reception status storage unit 202 is the command analysis status, the process proceeds to step S56, so that the reception control unit 217 performs the termination code string registration process shown in the flow charts in FIGS. 13 to 15.

In step S56, when the reception control unit 217 determines that the mode specifying information stored in the mode specifying information storage unit 204 is not the termination code string detection mode, that is, the mode specifying information stored is the normal mode, the reception control unit 217 sends a notice of the timeout to the decode processing unit 218, thereby completing the process.

An operation of the termination code string detection process in step S43 will be explained. FIG. 12 is a flow chart showing the termination code string detection process in step S43 shown in FIG. 10 according to the second embodiment of the present invention.

In step S431, when the reception control unit 217 determines that the internal processing information stored in the internal processing information storage unit 203 is set to the command analysis status in step S42, the reception control unit 217 sets zero to the number i stored in the RAM. In step S432, the reception control unit 217 retrieves the termination code string deemed number stored in the termination code string deemed number storage unit 206, and determines whether the matched number stored in the matched number storage area of the history area i is greater than the termination code string deemed number thus retrieved. When the reception control unit 217 determines that the matched number stored in the matched number storage area is less than the termination code string deemed number thus retrieved, the process proceeds to step S437.

When the reception control unit 217 determines that the matched number stored in the matched number storage area is greater than the termination code string deemed number thus retrieved, the reception control unit 217 retrieves the termination code string deemed byte number stored in the termination code string deemed byte number storage unit 207. In step S433, the reception control unit 217 determines whether the matched byte number stored in the matched byte number storage area of the history area i is greater than the termination code string deemed byte number thus retrieved. When the reception control unit 217 determines that the matched byte number stored in the matched byte number storage area is less than the termination code string deemed byte number thus retrieved, the process proceeds to step S436.

In step S434, when the reception control unit 217 determines that the matched byte number stored in the matched byte number storage area is greater than the termination code string deemed byte number thus retrieved, the reception control unit 217 sequentially compares the termination code string stored in the termination code string storage area in the history area i with the data stored in the reception buffer 201 most recently from the last byte one by one until they are not matched.

In step S435, after the reception control unit 217 sequentially compares the termination code string stored in the termination code string storage area in the history area i with the data stored in the reception buffer 201 most recently, the reception control unit 217 determines whether the matched byte number is greater than the termination code string deemed byte number stored in the termination code string deemed byte number storage unit 207. When the reception control unit 217 determines that the matched byte number is greater than the termination code string deemed byte number, the reception control unit 217 determines that the termination code string is detected, thereby completing the termination code string detection process.

In step S437, when the reception control unit 217 determines that the matched byte number is less than the termination code string deemed byte number, the reception control unit 217 adds one to the number i stored in the RAM. In step S438, the reception control unit 217 retrieves the maximum history area number n stored in the maximum history area number storage unit 213, and determines whether the number i stored in the RAM is less than the maximum history area number n thus retrieved. When the reception control unit 217 determines that the number i stored in the RAM is less than the maximum history area number thus retrieved, the process returns to step S432, thereby repeating the process described above.

In step S439, when the reception control unit 217 determines that the number i stored in the RAM is greater than the maximum history area number n thus retrieved, the reception control unit 217 determines that the termination code string is not detected, thereby completing the termination code string detection process.

An operation of the termination code string registration process in step S55 will be explained next. FIG. 13 is a flow chart No. 1 showing a process of registering the termination code string in step S55 shown in FIG. 11 according to the second embodiment of the present invention. FIG. 14 is a flow chart No. 2 showing the process of registering the termination code string in step S55 shown in FIG. 11 according to the second embodiment of the present invention. FIG. 15 is a flow chart No. 3 showing the process of registering the termination code string in step S55 shown in FIG. 11 according to the second embodiment of the present invention.

In step S551, when the reception control unit 217 determines that the reception status information stored in the reception status storage unit 202 is the command analysis status, the reception control unit 217 sets −1 to the unused history area number storage unit 208 and the matched history area number storage unit 209. In step S552, the reception control unit 217 sets three as the maximum matched byte number to the maximum matched byte number storage unit 210 indicating that the data stored in the reception buffer 201 most recently needs to have three bytes at minimum to be compared with the termination code string stored in the history area i of the history buffer 205. In step S553, the reception control unit 217 sets zero to the number i stored in the RAM (not shown).

In step S554, after the reception control unit 217 sets zero to the number i stored in the RAM, the reception control unit 217 determines whether the history area i in the history buffer 205 is used. In step S555, when the reception control unit 217 determines that the history area i in the history buffer 205 is not used, the reception control unit 217 sets the history area number i to the unused history area number storage unit 208, and the process proceeds to step S560.

In step S556, when the reception control unit 217 determines that the history area i in the history buffer 205 is used, the reception control unit 217 sequentially compares the termination code string stored in the termination code string storage area in the history area i with the data stored in the reception buffer 201 most recently from the last byte one by one until they are not matched.

In step S557, after the reception control unit 217 sequentially compares the termination code string stored in the termination code string storage area in the history area i with the data stored in the reception buffer 201 most recently, the reception control unit 217 determines whether the matched byte number is greater than the maximum matched byte number stored in the maximum matched byte number storage unit 210.

In step S558, when the reception control unit 217 determines that the matched byte number is greater than three stored in the maximum matched byte number storage unit 210, the reception control unit 217 sets the history area number i to the matched history area number storage unit 209. In step S559, the reception control unit 217 writes three stored in the maximum matched byte number storage unit 210 over the byte number matched between the data stored in the reception buffer 201 most recently and the termination code string stored in the termination code string storage area, and the process proceeds to step S560.

In step S560, when the reception control unit 217 determines that the matched byte number is less than three stored in the maximum matched byte number storage unit 210, the reception control unit 217 adds one to the number i stored in the RAM. In step S561, the reception control unit 217 determines whether the number i stored in RAM is less than the maximum history area number n stored in the maximum history area number storage unit 213. When the reception control unit 217 determines that the number i stored in RAM is less than the maximum history area number n stored in the maximum history area number storage unit 213, the process proceeds to step S554, thereby repeating the process described above.

In step S562, when the reception control unit 217 determines that the number i stored in RAM is greater than the maximum history area number n stored in the maximum history area number storage unit 213, the reception control unit 217 determines whether the matched history number stored in the matched history area number storage unit 209 is −1. In step S563, when the reception control unit 217 determines whether the matched history number stored in the matched history area number storage unit 209 is −1, the reception control unit 217 adds one to the matched number stored in the matched number storage area of the history area i.

In step S564, the reception control unit 217 retrieves the maximum matched byte number from the maximum matched byte number storage unit 210, and writes the maximum matched byte number over the matched number storage area of the history area i, thereby completing the termination code string registration process. Accordingly, the matched number and the matched byte number in the termination code string registered in the history buffer 205 are updated.

In step S565, when the reception control unit 217 determines that the matched history number stored in the matched history area number storage unit 209 is not −1 in step S562, the reception control unit 217 retrieves an unused history number from the unused history area number storage unit 208, and determines whether the unused number is −1. When the reception control unit 217 determines that the unused number is −1, that is, all history areas of the history buffer 205 are not used, the process proceeds to step S574. When the reception control unit 217 determines that the unused number is not −1, that is, all history areas of the history buffer 205 are used, the following process is performed for reutilizing the history area having a lowest possibility as the termination code string.

In step S566, the reception control unit 217 writes 255 in the minimum matched number storage unit 211 and the minimum matched byte number storage unit 212. In step S567, the reception control unit 217 sets zero to the number i stored in the RAM. In step S568, the reception control unit 217 retrieves the minimum matched number stored in the minimum matched number storage unit 211, and determines whether the matched number stored in the matched number storage area of the history area i is less than the minimum matched number thus retrieved. When the termination code string deemed byte number storage unit 207 determines that the matched number stored in the matched number storage area of the history area i is greater than the minimum matched number thus retrieved, the process proceeds to step S572.

In step S569, when the termination code string deemed byte number storage unit 207 determines that the matched number stored in the matched number storage area of the history area i is less than the minimum matched number thus retrieved, the reception control unit 217 retrieves the minimum matched byte number stored in the minimum matched byte number storage unit 212, and determines whether the matched byte number stored in the matched byte number storage area of the history area i is less than the minimum matched byte number thus retrieved.

When the termination code string deemed byte number storage unit 207 determines that the matched byte number stored in the matched byte number storage area of the history area i is greater than the minimum matched byte number thus retrieved, the process proceeds to step S572. In step S570, when the termination code string deemed byte number storage unit 207 determines that the matched byte number stored in the matched byte number storage area of the history area i is less than the minimum matched number thus retrieved, the reception control unit 217 sets the number i stored in the RAM to the unused history area number storage unit 208.

In step S571, the reception control unit 217 retrieves the minimum matched number stored in the minimum matched number storage unit 211, and writes the minimum matched number thus retrieved over the matched number storage area of the history area i. Further, the reception control unit 217 retrieves the minimum matched byte number stored in the minimum matched byte number storage unit 212, and writes the minimum matched byte number thus retrieved over the matched byte number storage area of the history area i.

In step S572, after the reception control unit 217 adds one to the number i stored in the RAM, the reception control unit 217 retrieves the maximum history area number n from the maximum history area number storage unit 213. In step S673, the reception control unit 217 determines whether the number i is less than the maximum history area number n. When the reception control unit 217 determines that the number i is less than the maximum history area number n, the process proceeds to step S568, thereby repeating the process described above.

When the reception control unit 217 determines that the number i is greater than the maximum history area number n, the reception control unit 217 retrieves the termination code string deemed byte number from the termination code string deemed byte number storage unit 207. Then, the reception control unit 217 retrieves an unused history area number from the unused history area number storage unit 208. In step S574, the reception control unit 217 retrieves data corresponding to the termination code string deemed byte number from the data stored in the reception buffer 201 most recently including the last letter. Then, the reception control unit 217 writes the data thus retrieved corresponding to the termination code string deemed byte number as the termination code string to the termination code string storage area of the history area i corresponding to the unused history area number thus retrieved.

In step S575, the reception control unit 217 sets one as the matched number to the matched number storage area of the history area i corresponding to the unused history area number thus retrieved. In step S576, the reception control unit 217 sets the termination code string deemed byte number thus retrieved to the matched byte number storage area of the history area i corresponding to the unused history area number thus retrieved, thereby completing the termination code string registration process.

As described above, in the embodiment, when the reception control unit 217 does not receive the data from the PC, the reception status information stored in the reception status storage unit 202 is the data reception status, and the mode specifying information stored in the mode specifying information storage unit 204 is the termination code string detection mode, the reception control unit 217 recognizes the data thus received as the candidate of the termination code string.

Then, the reception control unit 217 compares the candidate of the termination code string with the termination code string registered in the history area i of the history buffer 205. When the termination code string matching to the candidate of the termination code string is registered in the history area i of the history buffer 205, the reception control unit 217 determines that the candidate of the termination code string thus detected is the termination code string. Accordingly, it is possible to start the printing operation without waiting the reception timeout. As a result, even when the PDF file or the EPS file is received from the host device through the direct printing function, it is possible to reduce the printing start time of the file.

Conventionally, the PDF file or the EPS file sent from the host device is wrapped with the PJL using a file transmission utility, so that the image forming apparatus can recognize the termination code as the PJL. In wrapping the file, "@PJL ENTER LANGULAGE" is added to the head portion, and the UEL code is added to the end portion as the termination code. In the embodiment, the reception control unit 217 determines that the candidate of the termination code string is the termination code string. Accordingly, it is possible to eliminate the step of wrapping with the PJL.

In the embodiment, the reception control unit 217 automatically registers the data stored in the maximum matched byte number storage unit 210 most recently as the termination code string to the history area i of the history buffer 205. Accordingly, in addition to the termination code string in the PDF file or the EPS file, even when the file includes an arbitrary termination code string such as an in-house system, it is possible to reduce the printing start time of the file. Further, it is possible to eliminate the step of updating a control program every time the termination code string is registered.

In the first embodiment, the PC as the host device displays the termination code string comparison table edition tool screen. Using the screen, the termination code string is registered, changed, or added to the termination code string comparison table 105 of the image forming apparatus 10. Further, the termination code string registered in the termination code string comparison table 105 of the image forming apparatus 10 is retrieved. Alternatively, the termination code string comparison table edition tool screen is displayed on the operation panel unit 109. Using the screen, the termination code string is registered, changed, or added to the termination code string comparison table 105 of the image forming apparatus 10. Further, the termination code string registered in the termination code string comparison table 105 of the image forming apparatus 10 is retrieved, and the termination code string thus retrieved is sent to the PC.

In the first embodiment, when an external storage unit (for example, HDD), an EEPROM having a sufficient capacity, or the flash memory is provided, it is possible to continuously use the table value through reading and writing the contents of the termination code string comparison table 105 at a timing of power on or off.

In the second embodiment, when an external storage unit (for example, HDD), an EEPROM having a sufficient capacity, or the flash memory is provided, it is possible to continuously use the table value through reading and writing the contents of the history buffer 205 at a timing of power on or off. Accordingly, after the termination code string is registered, right after power is on, it is possible to make the termination code string in a recognizable state all the time.

The disclosure of Japanese Patent Application No. 2008-048518, filed on Feb. 28, 2008, is incorporated in the application by the reference.

While the invention has been explained with reference to the specific embodiments of the invention, the explanation is illustrative and the invention is limited only by the appended claims.

What is claimed is:

1. An image forming apparatus for receiving data from a host device to print on a print medium, comprising:
    a termination code string comparison table for storing a detection termination code string to detect a termination code string from the data; and
    a reception control unit for detecting a candidate of the termination code string from the data, said reception control unit comparing the candidate with the termination code string to determine whether the termination code string matched to the candidate is stored in the termination code string comparison table, said reception control unit determining the candidate to be the termination code string when the reception control unit determines that the termination code string matched to the candidate is registered in the termination code string comparison table.

2. The image forming apparatus according to claim 1, further comprising a reception status information storage unit for storing reception status information representing a reception status, said reception control unit setting a last code string of data received from the host device most recently as the candidate of the termination code string when a next data string is not received from the host device for a specific period of time after the reception status information stored in the reception status information storage unit is set during reception.

3. The image forming apparatus according to claim 1, further comprising a non-volatile storage unit for storing the termination code string comparison table, said non-volatile storage unit being rewritable.

4. The image forming apparatus according to claim 3, wherein said non-volatile storage unit includes a flash memory.

5. The image forming apparatus according to claim 1, wherein said termination code string comparison table is adapted so that the host device can edit the termination code string.

6. The image forming apparatus according to claim 1, wherein said reception control unit is adapted to register the candidate as a new termination code string to the termination code string comparison table when the reception control unit determines that the termination code string matched to the candidate is not registered in the termination code string comparison table.

7. The image forming apparatus according to claim 1, wherein said termination code string comparison table includes a history buffer having a plurality of history areas retaining the termination code string and history information of the data.

8. The image forming apparatus according to claim 1, wherein said termination code string comparison table includes a criteria for determining whether the reception control unit compares the candidate with the termination code string, said reception control unit determining whether the candidate satisfies the criteria, said reception control unit determining the candidate to be the termination code string when the candidate satisfies the criteria, and when the reception control unit determines that the termination code string matched to the candidate is registered in the termination code string comparison table.

9. The image forming apparatus according to claim 8, wherein said termination code string comparison table includes the criteria including a matched number of times when the reception control unit determines that the candidate matches to the termination code string.

10. The image forming apparatus according to claim 1, wherein said termination code string comparison table includes a plurality of storage areas storing the termination code string, said termination code string comparison table further including an unused storage area information storage unit for storing unused storage area information indicating an unused storage area not storing the termination code string, said reception control unit adding the candidate to the unused storage area when the reception control unit determines that the termination code string matched to the candidate is not registered in the termination code string comparison table.

11. The image forming apparatus according to claim 10, wherein said reception control unit is adapted to store the unused storage area information to the unused storage area information storage unit.

12. The image forming apparatus according to claim 11, wherein said unused storage area information includes a number identifying the unused storage area.

13. An image forming apparatus for receiving data including a plurality of codes from a host device to print on a print medium, comprising:
    a reception control unit for analyzing the data to detect a code string deemed to be a termination code; and
    a termination code string comparison table for storing a termination code string input from the host device,
    wherein said reception control unit compares the termination code with the termination code string retrieved from the termination code string comparison table to determine that the data includes the termination code from a comparison result.

14. An image forming apparatus for receiving data from a host device to print on a print medium, comprising:
    a reception unit for receiving the data including a plurality of codes;
    a history buffer for storing code strings having the codes;
    a reception control unit for analyzing the data to detect a code string deemed to be a termination code from an analysis result, said reception control unit storing the code string to the history buffer, said reception control unit comparing a detection result of a termination code detection unit with the code string stored in the history buffer; and a count number storage unit for counting a number of reception timeouts of the data, wherein said reception control unit determines that the data includes the termination code when a counter counts more than a specific number.

* * * * *